(12) United States Patent
Maenpaa

(10) Patent No.: US 8,509,407 B2
(45) Date of Patent: Aug. 13, 2013

(54) EVENT IDENTIFICATION IN PEER TO PEER NETWORKS

(75) Inventor: Jouni Maenpaa, Nummela (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/257,701

(22) PCT Filed: Mar. 23, 2009

(86) PCT No.: PCT/EP2009/053362
§ 371 (c)(1),
(2), (4) Date: Sep. 20, 2011

(87) PCT Pub. No.: WO2010/108535
PCT Pub. Date: Sep. 30, 2010

(65) Prior Publication Data
US 2012/0039453 A1  Feb. 16, 2012

(51) Int. Cl.
*H04M 3/00* (2006.01)
*H04L 12/56* (2006.01)

(52) U.S. Cl.
USPC .................................... 379/188; 370/395.5

(58) Field of Classification Search
USPC .............. 379/188, 190, 191, 192; 370/395.5, 370/432; 713/150; 709/243
See application file for complete search history.

(56) References Cited

U.S. PATENT DOCUMENTS

| | | | |
|---|---|---|---|
| 7,177,929 B2 * | 2/2007 | Burbeck et al. | 709/224 |
| 7,852,767 B2 * | 12/2010 | Twiss | 370/235 |
| 7,996,547 B2 * | 8/2011 | Sudhakar | 709/229 |
| 8,126,849 B2 * | 2/2012 | Schwan et al. | 707/655 |
| 2004/0064568 A1 | 4/2004 | Arora et al. | |
| 2004/0249972 A1 * | 12/2004 | White et al. | 709/243 |
| 2006/0067327 A1 | 3/2006 | Poustchi et al. | |
| 2006/0190716 A1 | 8/2006 | Miller | |
| 2011/0034182 A1 * | 2/2011 | Issa et al. | 455/456.3 |
| 2011/0106950 A1 * | 5/2011 | Schlack | 709/226 |

OTHER PUBLICATIONS

Jennings et al. REsource LOcation and Discovery (RELOAD) Base Protocol. Draft-jetf-p2psip-base-02. Internet Draft. Mar. 7, 2009.
Wang J. et al. P2PSIP Event Notification Extension. Draft-wang-p2psip-event-notification-00.txt. Internet Draft. Mar. 2, 2009.

* cited by examiner

Primary Examiner — William Deane, Jr.

(57) ABSTRACT

A system and method for event notification and access control for Distributed Hash Tables (DHTs) using an event triggering mechanism for DHT-based Peer-to-Peer (P2P) overlay networks is described. According to an embodiment of the invention, a user interested in certain event can insert a trigger into the DHT. When the event occurs, the trigger fires and causes a pre-defined action to be executed. According to another embodiment of the invention, a user peer inserts a trigger resource record, which includes instructions to execute a specified action upon occurrence of the event, into the DHT. A monitored resource record, with which the event is or will be associated, is identified. A monitoring peer, responsible for maintaining the monitored resource record, is then identified. The trigger resource record is maintained at the monitoring peer.

15 Claims, 3 Drawing Sheets

EVENT IDENTIFICATION IN PEER TO PEER NETWORKS

TECHNICAL FIELD

The present invention relates to event identification in P2P networks. In particular, the invention relates to an event triggering mechanism for DHT-based P2P overlay networks.

BACKGROUND

A hash table is a data structure that associates keys with values. A key may be, for instance, a person's name. The corresponding value may then be that person's contact address (e.g. email address or Session Initiation Protocol (SIP) Uniform Resource Identifier (URI)). The primary operation a hash table supports is lookup: given a key, the hash table finds the corresponding value.

Distributed Hash Tables (DHTs) provide a lookup service similar to a hash table. However, unlike regular hash tables, DHTs are decentralized distributed systems. In a DHT, the responsibility for maintaining mappings from names to values is distributed among the nodes (or peers) participating in the system. This is achieved by partitioning the key space among the participating nodes. The nodes are connected together by an overlay network, which allows the nodes to find the owner of any given key in the key space.

In the overlay network, each node maintains a set of links to other nodes. This set of links is the node's routing table. In some DHTs such as Chord (Stoica et al.: "Chord: A Scalable Peer-to-peer Lookup Service for Internet Applications"; in Proceedings of the ACM SIGCOMM'01 Conference, August 2001, San Diego, Calif., USA) the entries in the routing table are called fingers. In addition to the routing table, each node also maintains another data structure called the neighbour list. The neighbour list contains pointers to the immediate successors and predecessors (i.e., neighbours) of the node in the overlay network. A node picks its neighbours according to a certain structure, called the network's topology. One such topology, known as a ring topology in which the nodes are peers, is illustrated in FIG. 1. A peer 101 has immediate predecessors 102, 103 and immediate successors 104, 105. The peer 101 also maintains links in its routing table to three fingers 111, 112, 113 elsewhere in the network.

Each peer participating in the DHT is identified by its peer identifier (peer-ID), which is created by calculating a hash over certain piece of unique information such as the peer's IP address and port number. Many DHTs use Secure Hash Algorithm One (SHA-1) as the base hash algorithm. In DHTs, peer identifiers and resource identifiers (i.e. keys) are stored in the same namespace. As an example, in the Chord DHT, each peer is responsible for storing resources whose identifiers fall between its predecessor's peer identifier and its own peer identifier. Resource identifiers (resource-IDs) are also constructed (in an analogous manner to peer-IDs) by calculating a hash over a piece of information that uniquely identifies the resource. As an example, if the resource record is the contact address of a user's SIP terminal, the resource-ID can be formed by calculating a hash over the user's SIP URI. In a DHT, a user is responsible for storing his own contact information only if the resource-ID of his contact information falls in the portion of the identifier space his endpoint is responsible for.

Although DHTs have many benefits such as low capital cost, low operational cost, scalability, and robustness, they face certain challenges when used to distribute interpersonal communication systems such Voice over IP (VoIP), instant messaging and presence systems. In traditional client-server communication systems, all of the system's intelligence is located in centralized servers, whereas in peer-to-peer (P2P) systems, all of the system's intelligence is distributed to the endpoints. Client-server VoIP relies on centralized servers when providing features such as call control, presence, user registration, telephony supplementary services, and Network Address Translator (NAT) traversal, among other things. In P2P VoIP, these features need to be provided in a distributed fashion.

One challenge is the provision of a distributed presence service. In a pure P2P presence system, there is no central presence server to which users can update their presence status, and which can inform users about the changes in their buddies' presence status. Instead, users are responsible for tracking the presence status of their buddies themselves. To detect when his buddies join the P2P overlay, a user must poll these offline buddies periodically. Each periodic poll operation requires a P2P lookup that attempts to fetch the contact record of the buddy from the DHT. If the contact record cannot be found, the buddy is still offline. Ideally, the interval at which offline buddies are polled would be rather short so that there would not be a long gap between the buddy joining the overlay and the user detecting this. The problem with this approach is that the periodic lookups for offline buddies generate a lot of extra traffic into the overlay. If the polling interval is frequent, it is not uncommon that the majority of lookups in the system are lookups for offline buddies. This has a negative impact on performance since the system is flooded with such lookups.

To reduce the amount of polling traffic, the polling interval can be kept rather infrequent. This is the approach that real-world P2P presence systems have been forced to take. In these systems, it is not uncommon that it takes over five minutes from the moment that a user joins the system before his buddies detect this. This naturally results in poor user experience. Thus, P2P presence systems would greatly benefit from a mechanism that reduces or eliminates the polling traffic and yet makes the detection of peers becoming online almost immediate.

Telephony supplementary services are also difficult to provide in a distributed environment. In a traditional client-server system, supplementary services such as call forwarding, call barring, and completion of calls to busy subscribers are handled by centralized network components. There is no straightforward way to implement such services in a P2P environment.

One further problem is service discovery. In a P2P system, peers providing a particular service register as service providers into the overlay using the service identifier of the service. Other peers discover service providers by sending lookups for the service identifiers. If no service provider is available, a peer interested in the service must perform periodic lookups to detect when the service becomes available. Such periodic queries again cause extra traffic and degrade the performance of the system.

SUMMARY

It is an object of the present invention to address the difficulties associated with providing presence services, telephony supplementary services, and service discovery (inter alia) in DHT-based P2P systems.

The invention generally provides a generic event notification and access control mechanism for DHTs using an event triggering mechanism for DHT-based P2P overlay networks. A user interested in certain event can insert a trigger into the DHT. When the event occurs, the trigger fires and causes a pre-defined action to be executed.

In accordance with one aspect of the present invention there is provided a method of monitoring an event in a P2P network having a DHT. A user peer inserts a trigger resource record, which includes instructions to execute a specified action upon occurrence of the event, into the DHT. A monitored resource record, with which the event is or will be associated, is identified. A monitoring peer, responsible for maintaining the monitored resource record, is then identified. The trigger resource record is maintained at the monitoring peer.

The identification of the monitoring peer may be enabled by the calculation of a resource-ID key from the monitored resource record, for example by the use of a hash algorithm.

The monitoring peer may store the trigger record resource in a trigger database. Then when any event takes place which affects the monitored resource record, the monitoring peer checks the contents of the trigger database to find a trigger record resource for that event and monitored record. If a trigger record resource for that combination is present, then the specified action is executed.

Typical events which can be monitored in this manner include: the creation of the monitored resource record; the removal of the monitored resource record; an update to the monitored resource record; an attempt to read the monitored resource record; a counter associated with the monitored resource record reaching a threshold value; and a predetermined time period before expiry of the monitored resource record being reached. The specified action may include: sending a notification to the user peer that the event has taken place; sending a notification to an owner of the monitored resource record that the event has taken place; deleting the monitored resource record; incrementing or decrementing a counter contained in the trigger resource record; and/or allowing or restricting access to the monitored resource record.

In one embodiment, the event is the creation of the monitored resource record. In this case, when the trigger resource record is inserted into the DHT the monitored resource record does not yet exist. A resource identifier is predicted for the monitored resource record, and this resource identifier is used to identify of the monitoring peer.

The monitored resource record may be the contact information of a second user, and the creation of the monitored resource record may result from the second user becoming online. Thus the trigger record may be used to provided a presence service. Alternatively, the monitored resource record may be a service resource record associated with a service, and the creation of the monitored resource record may result from the service becoming available.

In either case a lookup request may initially be sent by the user peer to identify whether the monitored resource record exists. The lookup request may contain instructions to insert the trigger resource record into the DHT if it is identified that the monitored resource record does not exist.

The trigger resource record may be associated with an existing monitored resource record. In one embodiment the event may be an attempt by a third party peer to gain access to the monitored resource record. The trigger resource record may then include a whitelist of peers for which access to the monitored resource record is allowed, and/or a blacklist of peers for which access to the monitored resource record is not allowed. The specified action may include permitting or restricting access to the monitored resource record on the basis of whether the third party peer is on the whitelist or blacklist. The trigger resource record may include an access restriction reason why access is restricted for peers on the blacklist.

The use of a whitelist and/or blacklist enables the provision of telephony services. For example, call redirecting may be implemented if the access restriction reason is that incoming calls to the monitored resource record should be redirected. The specified action may include restricting access to the third party peer and providing to the third party peer an identification of an alternative resource record to which access should be attempted. Completion of calls to busy subscribers may be implemented if the access restriction reason is that the user peer is busy, and the specified action includes restricting access to the third party peer and notifying the third party peer that the user peer is busy. In this case the third party peer may insert a further trigger resource record into the DHT to monitor the trigger resource record, so that if the trigger resource record is removed a further attempt to gain access to the monitored resource record can be made.

The information in the trigger resource record may include: a trigger-ID identifying the trigger resource record; a monitored-ID identifying the monitored resource record; an event-ID identifying the type of event being monitored; a trigger-action-ID identifying the specified action which is to take place upon occurrence of the event; and an inserting-peer-ID identifying the user peer.

The invention also provides a P2P network comprising peers arranged to carry out the method described above.

In accordance with another aspect of the present invention there is provided a user peer for use in a P2P network having a DHT. The user peer comprises a processor for generating a trigger resource record which includes instructions to execute a specified action upon occurrence of a monitored event and an identification of a monitored resource record with which the monitored event is or will be associated. The user peer also comprises a transmitter for sending the trigger resource record into the P2P network for insertion into the DHT, such that the trigger resource record is maintained at a monitoring peer responsible for maintaining the monitored resource record.

In accordance with another aspect of the present invention there is provided a monitoring peer for use in a P2P network having a DHT. The monitoring peer comprises a storage function for maintaining a monitored resource record. A receiver is provided for receiving a trigger resource record from a user peer, the trigger resource record including instructions to execute a specified action upon occurrence of an event associated with the monitored resource record. A processor is provided for executing the specified action. The monitoring peer is also arranged to maintain the trigger resource record, optionally in a trigger database.

It will be appreciated that the terms "user peer" and "monitoring peer" are labels used for the sake of convenience, and that one peer may able to perform the functions of both simultaneously.

DETAILED DESCRIPTION

DHT Trigger

Figure 1:
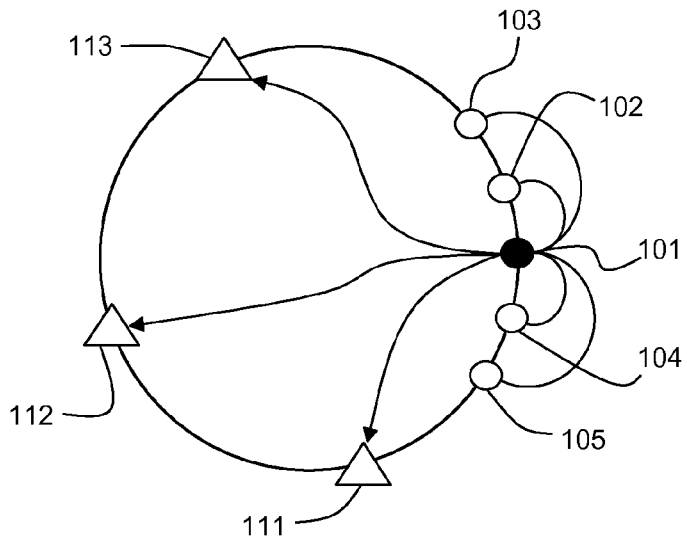
FIG. 1 is a schematic diagram illustrating nodes in a ring topology.

A DHT trigger takes the form of a special resource record that can be stored in a DHT-based overlay network either in a standalone fashion or by attaching it to an existing resource record. In the first case, the trigger is called a standalone trigger, since it has not been attached to any resource record. In the second case, the trigger is called an attached trigger. Standalone and attached triggers are further discussed below.

The protocol that is spoken between the peers in an overlay network is called the peer protocol. In Peer-to-Peer Session Initiation Protocol (P2PSIP) systems, the Resource Location and Discovery (RELOAD) protocol is used as the peer protocol. Trigger records are created by using a new peer protocol message which is here referred to as the InsertTrigger message. A DHT trigger can be used to subscribe to events occurring in the overlay network. When the event occurs, the action specified in the trigger record is executed. One possible action is the generation of a notification request. Such notifications are sent using a new peer protocol message which is here referred to as the TriggerAction message.

Trigger Events

As mentioned above, DHT triggers can be used to subscribe to various events occurring in a P2P overlay network. Examples of such events are listed in Table 1.

TABLE 1

Trigger events

| Event type | Event-ID | Description |
|---|---|---|
| Resource-created | 1 | A resource record is created. Example: Alice wants to be notified when Bob stores his contact information into the overlay. |
| Resource-removed | 2 | A resource record is removed. |
| Resource-updated | 3 | A resource record is updated. Example: Alice's P2P application wants to be notified whenever Bob's IP address changes. |
| Resource-read | 4 | A resource record is fetched: Example: Alice wants to be notified whenever somebody fetches a file she has stored in the overlay. |
| Counter-threshold-reached | 5 | A counter associated with a resource record reaches a specified threshold value. In this case, the trigger is not attached to a resource record, but to a counter. |
| Resource-about-to-expire | 6 | A resource record is about to expire. Example: Alice wants to be notified before her contact information expires so that she can refresh the contact information. |

Trigger Actions

Each trigger specifies an action that should be carried out when the event to which the user has subscribed by inserting the trigger occurs. When the event occurs, the action specified in the trigger is carried out. Possible actions include for instance those specified in Table 2.

TABLE 2

Trigger actions

| Action type | Action-ID | Description |
|---|---|---|
| Notify-me | 1 | Send a TriggerAction message to the party that inserted the trigger |
| Notify-owner | 2 | Notify the owner of the resource record for which the trigger was created by sending a TriggerAction message. |
| Delete | 3 | Delete the resource record to which the trigger is attached. |
| Increment-counter | 4 | Increment the counter of the trigger record by one |
| Decrement-counter | 5 | Decrement the counter of the trigger record by one |
| Validate-peer | 6 | Check whether the party trying to access the resource record has the permission to do so |

Standalone Triggers

A standalone trigger is used when the resource record that is of interest to the user does not exist yet, meaning that no-one has stored a resource record with the specified resource-ID in the overlay. In this case, the event the user is interested in is the creation of the resource record. A standalone trigger is stored using the resource-ID of the resource to which the trigger is related. As an example, if the resource is the contact information of user Alice, whose SIP URI is "sip:alice@example.com", the trigger is stored using the resource-ID of Alice's contact record. This resource-ID can be obtained by calculating a hash over the SIP URI of Alice using the hash algorithm defined by the overlay algorithm.

Figure 4:
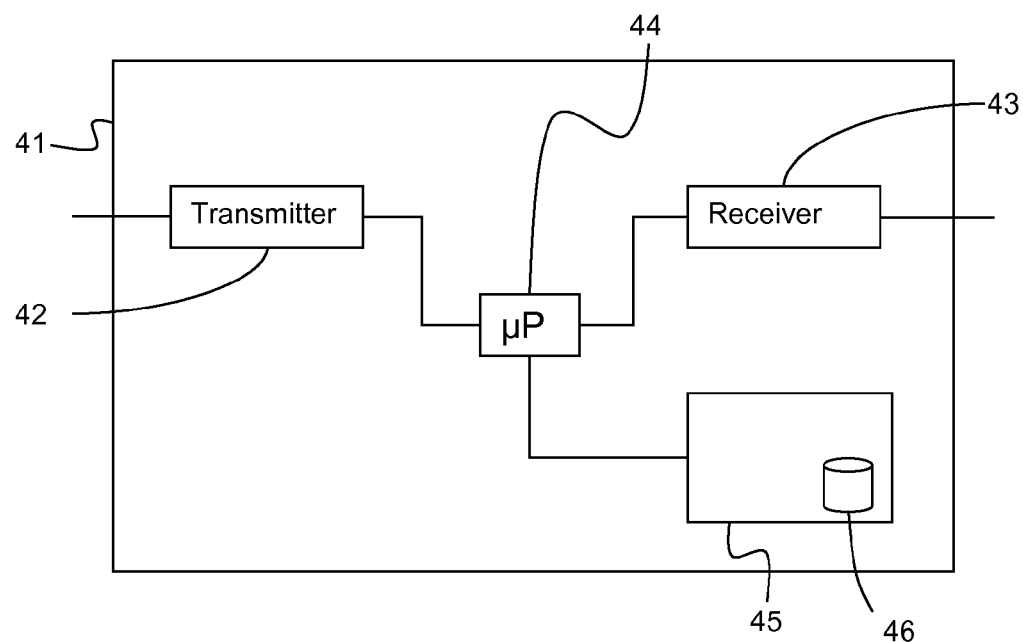
FIG. 4 is a schematic diagram illustrating the architecture of a peer.

Since the triggers are stored using the resource-ID of the record with which they are associated, they will be stored by the peer responsible for maintaining this record. This can be understood with reference to FIG. 4, which is a schematic diagram of the architecture of a typical peer 41. The peer 41 includes a transmitter 42 for sending information (such as trigger records) into the network, and a receiver 43 for receiving information from the network. A processor 44 is capable of generating trigger records and/or carrying out actions specified in a trigger record. Records are stored by a storage medium 45, part of which may be a dedicated trigger database 46.

Returning to the example above and considering also the ring topology shown in FIG. 1, suppose that the user peer 101 wishes to be notified when Alice comes online. The resource-ID for Alice's contact record is calculated, and this will indicate which of the peers in the network (for example, the peer 112 maintained as a finger by the user peer 101) will be responsible for maintaining Alice's contact record when she becomes online. Since peer 112 is responsible for Alice's contact record, it also stores the trigger in its trigger database 46.

Figure 2:
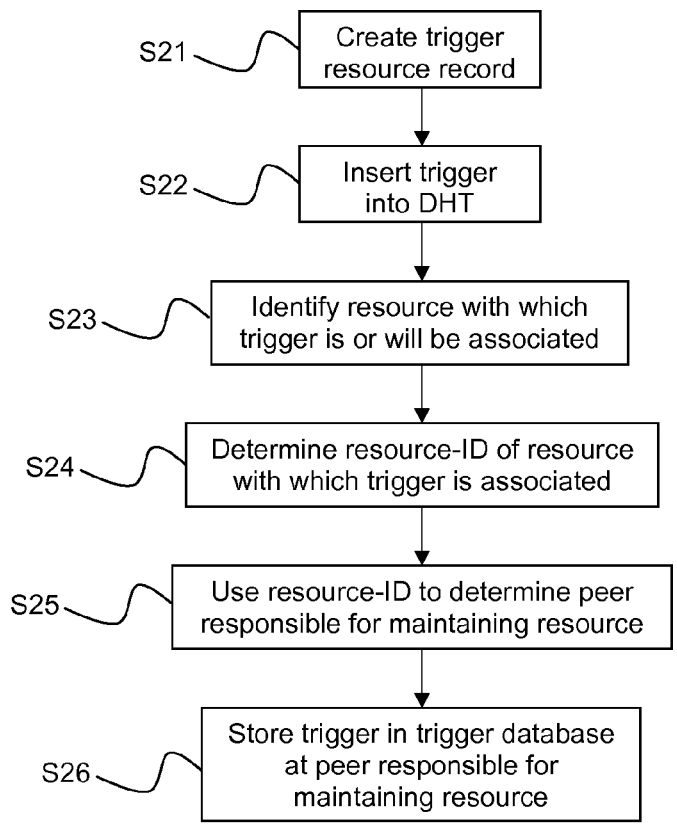
FIG. 2 is a flow diagram illustrating the insertion of a trigger into a DHT.

This process is also illustrated in FIG. 2. In step S21, the user peer 101 creates a trigger record. In step S22 this trigger is inserted into the DHT. In step S23 the resource with which the trigger is (or will be) associated is identified. In the example above this resource is Alice's contact record. In step S24, the resource-ID of this resource is determined. In step S25 the resource-ID is used to determine which peer (e.g. finger 101) is responsible for maintaining this resource. In step S26 the trigger is stored at that peer.

Whenever a peer is requested to store a resource record, it first checks whether there exist any standalone triggers stored with the resource-ID of the resource. If triggers exist, their trigger actions are executed. So, in the example above, as soon as peer 112 is requested to store Alice's contact record, it checks its trigger database and discovers the trigger inserted by the user peer 101. It then executes the action contained therein, which is to notify the user peer 101 that Alice has come online.

Standalone triggers can be created in two ways. In one mechanism, an InsertTrigger request can be sent to the peer responsible for the resource-ID that is of interest to the sender. In another mechanism, a peer performing a lookup can specify in the peer protocol Lookup request that a trigger should be automatically created if no resource record with the specified resource-ID exists. For this, a new flag, create TriggerIfResourceNotFound can be used in the Lookup request.

Attached Triggers

An attached trigger is a trigger that has been created for an existing resource record. Attached triggers can be used to add extra service logic to resource records. As an example:

A user can attach to his contact record a trigger that tells the peer responsible for storing the contact record to notify the user when the contact record is about to expire.

A user can attach a trigger that tells the peer responsible for storing a specific resource record to inform the user whenever the resource record is updated or deleted. If the resource record is a contact record, the user may insert a trigger so that she learns whenever the contact address associated with the contact record changes.

There are different types of attached triggers:

Regular—A standard trigger that is extended by the other types

Counter—Extends a regular trigger with the ability to keep track of how many times the trigger event has occurred.

Access-control—Extends a regular trigger with an access control list that specifies which peers are allowed to access the resource record and which peers aren't.

Multiple Peers Adding Triggers to the Same Resource

In many cases, multiple peers are interested in adding triggers to the same resource. This can happen, for instance, when multiple peers have the same user as a buddy and want to learn when that user stores her contact information into the overlay. To support this, peers should store the triggers they are responsible for in a trigger database. The key to the trigger database is the resource-ID of the resource for which the trigger was created. Whenever a particular resource is created, accessed, modified or deleted, the peer responsible for the resource should check whether the trigger database contains any trigger records that are related to the resource-ID of the resource and process them.

Transferring Trigger Records

Trigger records need to be transferred between peers in the overlay network as new peers join and old ones leave, in exactly the same fashion as regular resource records are transferred. The fact which peer is responsible for storing a given resource record at a specific moment is dictated by the DHT algorithm. A standalone trigger is transferred whenever a new peer that joins the overlay network becomes responsible for the portion of the identifier space to which the resource-ID for which the trigger was created belongs or when the peer that is currently responsible for the resource-ID leaves the network. Attached triggers are transferred whenever the resource record to which the trigger has been attached is transferred.

Format of a Trigger

A trigger record consists of the pieces of information specified in Table 3.

TABLE 3

Fields of a regular trigger

| Field | Description |
|---|---|
| Trigger-ID | Assigned by the peer that is responsible for the resource for which the trigger was created. The Trigger-ID is returned to the peer that added the trigger in a response to the InsertTrigger request. The combination of Trigger-ID and Monitored-ID uniquely identifies the trigger |
| Monitored-ID | Identifier of a resource record or another trigger to which this trigger is related. If the event field contains the event type counter-threshold-reached, the monitored-ID field can only contain a trigger-ID. |
| Event | Contains one of the event-IDs specified in Table 1. |
| Trigger-action | Contains one of the action-IDs specified in Table 2 |
| Inserting-peer-ID | The identifier of the peer that created the trigger. |

In addition to the fields listed in Table 3, an attached trigger of type counter has the additional fields specified in Table 4.

TABLE 4

Additional fields in a counter trigger

| Field | Description |
|---|---|
| Counter | Incremented (if the trigger-action is increment-counter) or decremented (if the trigger-action is decrement-counter) when the event specified in the event field occurs. |
| Counter-threshold | Specifies a threshold value. Another trigger can be attached to a counter trigger to monitor the threshold value. |

In addition to the fields listed in Table 3, an access-control trigger has the extra fields listed in Table 5.

TABLE 5

Additional fields in an access control trigger

| Field | Description |
|---|---|
| List-type | Can have two values, blacklist or whitelist |
| List | Contains blacklisted or whitelisted peer-IDs. If list-type of the access control trigger is blacklist, the list contains identifiers of peers that are not allowed to fetch the resource record to which the trigger is related. A special value "*" (implemented for instance as a peer-ID in which all bits are ones), is used to specify that all peers are blacklisted. If list-type is whitelist, the list contains peers who have the right to access the resource record. |
| Access-restricted-reason | Specifies why access to the resource record is being restricted. This field can have among others the following values: (0 = busy, 1 = no-rights, 2 = redirect, 3 = blocked). If a peer that is trying to fetch an access controlled resource record is not allowed to do so, the error response that is returned to the peer will contain the access-restricted-reason value in a new header field which is here referred to as the reject-reason field. |
| Alternative-resource-ID | Contains the resource-ID of an alternative resource record that can be fetched by the remote peer. For instance, if reject-reason is redirect, the alternative-resource-ID field should contain the resource-ID of an alternative contact record that can be used to reach the user. |

Using DHT Triggers to Implement Presence Service

In a P2P presence system, a user has to periodically poll her offline buddies in order to discover when the buddies store their contact information into the overlay (i.e., become online). Instead of polling the status of each offline buddy, the user can store standalone DHT triggers for the resource-IDs of her buddies' contact records. Thanks to the trigger, the user is notified as soon as a buddy joins the overlay and stores his contact record. As explained above, the user can construct the resource-ID of a buddy's contact record by calculating a hash over the buddy's SIP URI.

As an example, if Alice wishes to learn when Bob, whose SIP URI is sip:bob@example.com, joins the P2P overlay, Alice will insert a trigger whose fields contain the following values into the overlay:
  Trigger-type: regular
  Trigger-ID: Set by the peer that will store the trigger
  Monitored-ID: hash(sip:bob@example.com)
  Trigger action: notify-me
  Event: created
  Inserting-peer-ID: Alice's endpoint's peer-ID Since Bob's contact record does not exist in the overlay yet, the trigger Alice inserts will become a standalone trigger. The trigger will be stored at the peer who is currently responsible for the Monitored-ID.

Figure 3:
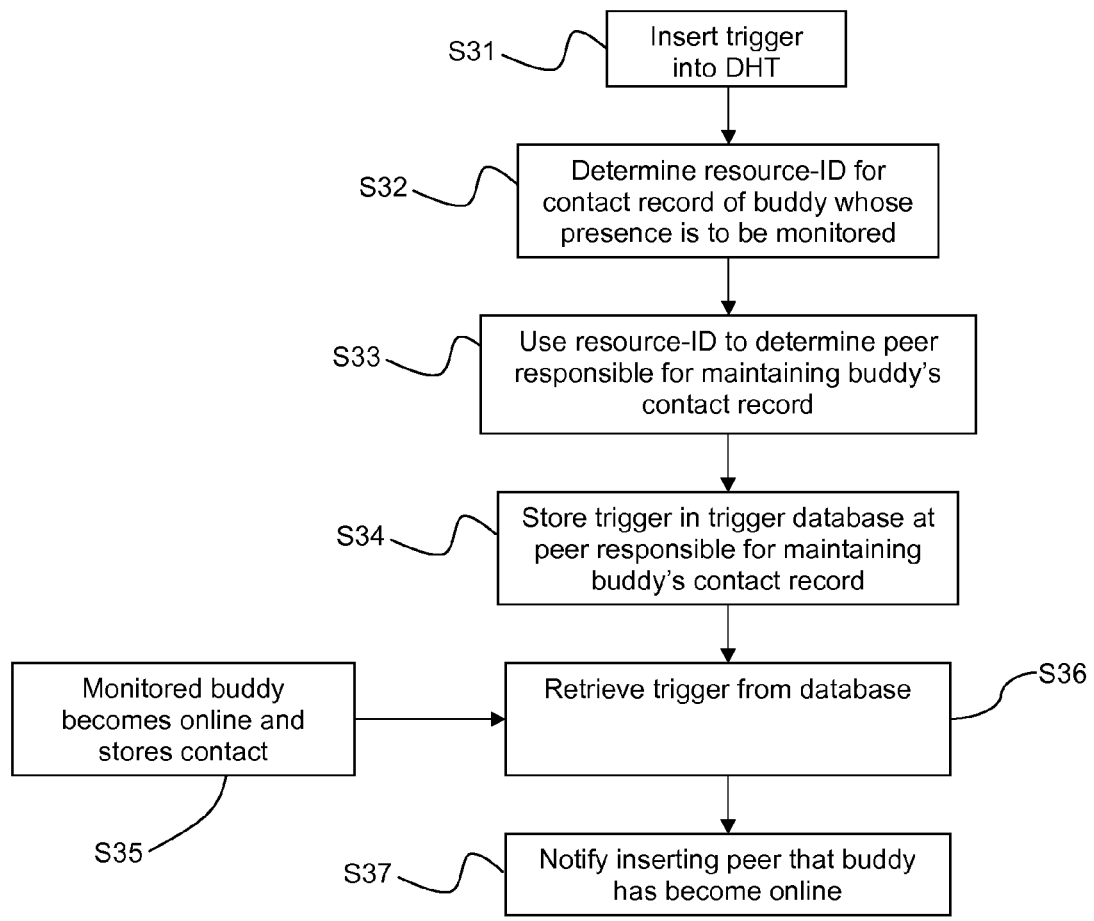
FIG. 3 is a flow diagram illustrating the use of a DHT trigger to implement presence service.

This can also be seen with reference to FIG. 3. Alice inserts the trigger (S31) into the DHT. The resource-ID for Bob's contact record is determined (S32) and used to determine the peer responsible for maintaining Bob's contact record (S33). The trigger is stored (S34) in a trigger database at that peer. When Bob becomes online (S35) the trigger is retrieved from the database (S36) and the action specified therein—to notify Alice that Bob is now online—is executed (S37).

Using DHT Triggers to Implement Access Control

An attached trigger of type access-control can be used to specify which peers are allowed to access a specific resource record (whitelist) or which peers don't have the right to access the resource record (blacklist). In this case the action specified in the trigger record is validate-peer (see Table 2). If the peer that is trying to access the resource record by sending a peer protocol Lookup request does not have the right to do so, the Lookup request is rejected.

As an example, if Alice wants to deny access to her contact information from a set of peers, Alice will create an access control trigger with the following contents:
  Trigger-type: access-control
  Trigger-ID: Set by the peer that will store the trigger
  Monitored-ID: hash(sip:alice@example.com)
  Trigger action: validate-peer
  Event: resource-read
  Inserting-peer-ID: Alice's endpoint's peer-ID
  List-type: blacklist
  List: The set of Blacklisted peer-IDs
  Access-restricted-reason: no-rights
  Alternative-resource-ID: empty DHT Triggers and Counters An attached trigger of type counter can be used to associate an event counter with a resource record. A user may for instance be interested in how many times an image he has stored in the overlay has been viewed.

As an example, let's assume Alice has stored an image in the overlay and wants to associate a counter with the resource record of the image. The initial value of the counter is zero and the counter should be increment each time the resource record of the image is fetched. The trigger Alice attaches to the resource record of the image is shown below:
  Trigger-type: counter
  Trigger-ID: Set by the peer that will store the trigger
  Monitored-ID: The resource-ID of the image
  Trigger-action: increment-counter
  Event: resource-read
  Inserting-peer-ID: Alice's endpoint's peer-ID
  Counter: 0
  Counter-threshold: 10

Alice is also interested in receiving a notification when the value of the counter reaches the value ten (as specified in the counter-threshold field above). In this case, Alice creates another trigger. This second trigger is a regular trigger specifying the trigger-action notify-me and event counter-threshold-reached. This second trigger is attached to the first trigger by setting the resource-ID field of the trigger to contain the trigger-ID of the first record. Note that a trigger that monitors the counter-threshold-reached event can never be attached to a resource record, but only to another trigger record whose type is counter. The second trigger Alice stores looks as follows:
  Trigger-type: regular
  Trigger-ID: Set by the peer that will store the trigger
  Monitored-ID: The trigger-ID of the first trigger
  Trigger-action: notify-me
  Event: counter-threshold-reached
  Inserting-peer-ID: Alice's endpoint's peer-ID Triggers and Service Discovery Peers participating in a P2P overlay can offer services to each other. One example of a service that peers can provide to each other is a TURN (Traversal Using Relays around Network address translation) relay service. A peer offering a TURN service stores a resource record with the service-ID of the TURN service into the overlay, or adds its information into an existing record if a TURN service record already exists. If another peer is interested in a specific service (such as the TURN relay service), but no other peer is currently offering the service, the DHT triggering mechanism can be used to create a standalone trigger for the service-ID of the service. Thus, users that have inserted triggers get a notification when the service becomes available.

Triggers and Telephony Supplementary Services

Telephony supplementary services typically require centralized call control components and are thus difficult to implement in distributed P2P overlays. However, the DHT triggering mechanism offers a way to offer certain supplementary services in a distributed way. Below three supplementary services, barring of incoming calls, call forwarding, and completion of calls to busy subscribers are used as examples.

Barring of Incoming Calls

The barring of incoming calls supplementary service can be implement by using the access control mechanism described in Section 0. To block incoming calls from a subset or from all peers, a user can create an access control trigger for his contact record.

As an example, to block all incoming calls, the access control trigger specific fields of a trigger record should be set as follows:
  List-type: blacklist
  List: *
  Access-restricted-reason: block
  Alternative-resource-ID: empty Call Forwarding The call forwarding supplementary service can be implemented by using an access control trigger whose access control trigger specific fields have the following values:
  Type: blacklist
  List: *
  Access-restricted-reason: redirect
  Alternative-resource-ID: the resource-ID of the contact
    record of the endpoint to which the call should be forwarded Completion of Calls to Busy Subscribers To activate the completion of calls to busy subscribers service, a user who is engaged in a call should create an access control trigger for his contact record. The access control trigger should have the following information:
List-type: blacklist
List: *
Access-restricted-reason: busy
Alternative-resource-ID: empty When a caller tries to fetch the contact record of a busy user, he will receive an error response in which the reject-reason field has the value busy. Now, the caller can attach a trigger to the access control trigger of the busy user's contact record. This trigger is a regular trigger and has the following information:
Monitored-ID: the trigger-ID of the access control trigger
Trigger-action: notify-me
Event: resource-removed
Inserting-peer-ID: the peer-ID of the caller Because the caller has inserted this trigger, he will receive a notification when the called user removes the access control trigger. Thus, the caller will learn when the called user is no longer busy (i.e., when the call is over).

Thus it can be seen that the approach described above addresses some of the challenges faced by DHT-based P2P systems when used for person-to-person communication such as VoIP, presence, and instant messaging. In particular, due to the distributed nature of the system, the endpoints participating in the P2P overlay are responsible for providing many of the services that in client-server systems are provided by centralized servers. Two examples of services that are difficult to provide efficiently in P2P communication systems are presence and telephony supplementary services, and it will be appreciated that both are facilitated by the use of triggers.

In particular, one major problem in a distributed presence service is the polling necessary to detect when offline buddies join the P2P overlay network. This can cause a significant amount of excess traffic in the network and thus degrade its performance. One benefit of the system described is that it provides a way to completely eliminate such polling traffic.

Another problem with previously known P2P presence systems is that the delay between a user joining the system and his buddies detecting this can be considerable. This naturally results in poor user experience. Besides eliminating the polling traffic, the proposed DHT triggering mechanism also eliminates this delay.

In addition to optimizing P2P presence, the DHT triggering mechanism can also be used to implement traditional telephony supplementary services in P2P VoIP systems. Examples of such services include call forwarding, completion of calls to busy subscribers, and call barring. The triggering mechanism also provides a way to implement an access control service for resource records in a P2P overlay network. Additionally, the DHT triggers can be used to implement an event counting service in P2P overlay networks. The mechanism can also be used to improve service discovery mechanisms in DHT-based overlay networks.

It will be appreciated that variations from the above described embodiments may still fall within the scope of the invention, which is defined in the accompanying claims.

The invention claimed is:

1. A method of monitoring an event in a Peer-to-Peer (P2P) network having a Distributed Hash Table (DHT), the method comprising:
identifying a monitored resource record with which the event is associated;
identifying a monitoring peer responsible for maintaining the monitored resource record;
inserting a trigger resource record into the DHT by a user peer, the trigger resource record including instructions to execute a specified action upon occurrence of the event; and
maintaining the trigger resource record at the monitoring peer, wherein the following applies:
when the trigger resource record is inserted into the DHT, the monitored resource record does not yet exist,
a resource identifier is predicted for the monitored resource record and used to identify the monitoring peer, and
the event is the creation of the monitored resource record.

2. The method of claim 1, wherein a resource-ID key is calculated from the monitored resource record using a hash algorithm, so as to enable the identification of the monitoring peer.

3. The method of claim 1, wherein the trigger resource record includes:
a trigger-ID identifying the trigger resource record;
a monitored-ID identifying the monitored resource record;
an event-ID identifying the type of event being monitored;
a trigger-action-ID identifying the specified action which is to take place upon occurrence of the event; and
an inserting-peer-ID identifying the user peer.

4. A P2P network comprising peers configured to carry out the method of claim 1.

5. The method of claim 1, wherein the monitored record is the contact information of a second user, and wherein the creation of the monitored resource record results from the second user becoming online.

6. The method of claim 1, wherein the monitored resource record is a service resource record associated with a service, and wherein the creation of the monitored resource record results from the service becoming available.

7. The method of claim 1, wherein a look-up request is sent by the user peer to identify whether the monitored resource record exists, the lookup request containing instructions to insert the trigger resource record into the DHT if it is identified that the monitored resource record does not exist.

8. The method of claim 1, wherein the specified action includes sending a notification to the user peer that the event has taken place.

9. The method of claim 1, wherein the following applies:
the monitoring peer stores the trigger record resource in a trigger database;
when the event of creation of the monitored resource record occurs, the monitoring peer checks the contents of the trigger database to find the trigger record resource for that event and monitored resource record; and
the specified action is executed.

10. A user peer for use in a Peer-to-Peer (P2P) network having a Distributed Hash Table (DHT), the user peer comprising:
a processor for generating a trigger resource record, the trigger resource record including instructions to execute a specified action upon occurrence of a monitored event and an identification of a monitored resource record with which the monitored event is associated; and
a transmitter for sending the trigger resource record into the P2P network for insertion into the DHT, such that the trigger resource record is maintained at a monitoring peer responsible for maintaining the monitored resource record, wherein the following applies:

when the trigger resource record is inserted into the DHT, the monitored resource record does not yet exist, a resource identifier is predicted for the monitored resource record and used to identify the monitoring peer, and the monitored event is the creation of the monitored resource record.

11. The user peer of claim 10, wherein a look-up request is sent by the user peer to identify whether the monitored resource record exists, the lookup request containing instructions to insert the trigger resource record into the DHT if it is identified that the monitored resource record does not exist.

12. The user peer of claim 10, wherein one of the following applies:

the monitored resource record is the contact information of a second user, wherein the creation of the monitored resource record results from the second user becoming online, and wherein the specified action includes sending a notification to the user peer that the second user has come online; and the monitored resource record is a service resource record associated with a service, wherein the creation of the monitored resource record results from the service becoming available, and wherein the specified action includes sending a notification to the user peer that the service has come online.

13. A monitoring peer for use in a Peer-to-Peer (P2P) network having a Distributed Hash Table (DHT), the monitoring peer comprising:

a storage function for maintaining a monitored resource record;

a receiver for receiving a trigger resource record from a user peer, the trigger resource record including instructions to execute a specified action upon occurrence of an event associated with the monitored resource record; and a processor for executing the specified action, wherein the following applies:

the monitoring peer is configured to maintain the trigger resource record, when the timer resource record is received from he user peer, the monitored resource record does not yet exist, a resource identifier is predicted by the user peer for the monitored resource record and used to identify the monitoring peer, the event is the creation of the monitored resource record, and the specified action includes sending a notification to the user peer that the event has taken place.

14. The monitoring peer of claim 13, wherein the monitoring peer includes a trigger database in which the trigger record resource is stored, and the monitoring peer is configured so that, when the event of creation of the monitored resource record occurs, the contents of the trigger database are checked to find the trigger record resource for that event and monitored record, and the specified action is executed.

15. The monitoring peer of claim 13, wherein one of the following applies:

the monitored resource record is the contact information of a second user, wherein the creation of the monitored resource record results from the second user becoming online, and wherein the specified action includes sending a notification to the user peer that the second user has come online; and the monitored resource record is a service resource record associated with a service, wherein the creation of the monitored resource record results from the service becoming available, and wherein the specified action includes sending a notification to the user peer that the service has come online.

* * * * *

UNITED STATES PATENT AND TRADEMARK OFFICE
CERTIFICATE OF CORRECTION

PATENT NO. : 8,509,407 B2  
APPLICATION NO. : 13/257701  
DATED : August 13, 2013  
INVENTOR(S) : Maenpaa Page 1 of 1

It is certified that error appears in the above-identified patent and that said Letters Patent is hereby corrected as shown below:

In the Specification

In Column 3, Line 48, delete "to provided" and insert -- to provide --, therefor.

In Column 7, Line 31, delete "types" and insert -- types. --, therefor.

In the Claims

In Column 12, Line 39, in Claim 7, delete "look-up" and insert -- lookup --, therefor.

In Column 13, Line 9, in Claim 11, delete "look-up" and insert -- lookup --, therefor.

In Column 14, Line 4, in Claim 13, delete "timer" and insert -- trigger --, therefor.

In Column 14, Line 4, in Claim 13, delete "he" and insert -- the --, therefor.

Signed and Sealed this  
Twenty-seventh Day of May, 2014

Michelle K. Lee  
*Deputy Director of the United States Patent and Trademark Office*